(12) United States Patent
Chang

(10) Patent No.: US 9,798,156 B2
(45) Date of Patent: Oct. 24, 2017

(54) SIGHT

(71) Applicants: Sintai Optical (Shenzhen) Co., Ltd., Shenzhen, Guangdong Province (CN); Asia Optical International Ltd., Taichung (TW)

(72) Inventor: Chia-Kan Chang, Taichung (TW)

(73) Assignees: SINTAI OPTICAL (SHENZHEN) CO., LTD., Taichung (TW); ASIA OPTICAL INTERNATIONAL LTD., Taichung (TW)

( * ) Notice: Subject to any disclaimer, the term of this patent is extended or adjusted under 35 U.S.C. 154(b) by 117 days.

(21) Appl. No.: 14/998,633

(22) Filed: Jan. 28, 2016

(65) Prior Publication Data

US 2016/0231584 A1 Aug. 11, 2016

(30) Foreign Application Priority Data

Feb. 6, 2015 (CN) .......................... 2015 1 0065265

(51) Int. Cl.
| F41G 1/38 | (2006.01) |
| G02B 27/36 | (2006.01) |
| G02B 23/14 | (2006.01) |
| G02B 23/00 | (2006.01) |

(52) U.S. Cl.
CPC .............. *G02B 27/36* (2013.01); *F41G 1/38* (2013.01); *G02B 23/14* (2013.01); *G02B 23/145* (2013.01)

(58) Field of Classification Search
CPC ... F41G 1/38; F41G 1/30; F41G 1/467; F41G 1/345; F41G 1/473; G02B 27/36; G02B 23/14; G02B 23/145
USPC ...................................... 33/263, 265
See application file for complete search history.

(56) References Cited

U.S. PATENT DOCUMENTS

| 7,934,335 B2 * | 5/2011 | Halverson | ................. F41G 1/16 42/137 |
| 2008/0236018 A1 * | 10/2008 | Halverson | ................. F41G 1/16 42/135 |
| 2016/0231584 A1 * | 8/2016 | Chang | .................... G02B 27/36 |

* cited by examiner

*Primary Examiner* — Yaritza Guadalupe-McCall
(74) *Attorney, Agent, or Firm* — McClure, Qualey & Rodack, LLP

(57) ABSTRACT

The sight includes a main body, a regulating bolt movably joined to the main body, a securing bolt fixed to the regulating bolt, a regulating cover covering the regulating bolt and movable between a first position and a second position with respect to the regulating bolt, a first magnet disposed on the regulating cover, and a second magnet disposed on the regulating bolt and corresponding to the first magnet. The regulating cover is movable with respect to the regulating bolt when the regulating cover moves away from the second position. The regulating cover abuts the securing bolt and is rotatable with respect to the regulating bolt when the regulating cover moves to the first position. The regulating cover engages the regulating bolt when the regulating cover moves to the second position. The regulating cover is maintained in the second position through attraction of the first magnet and the second magnet.

12 Claims, 7 Drawing Sheets

SIGHT

BACKGROUND OF THE INVENTION

Field of the Invention

The invention relates to a sight, and more particularly to a sight capable of being zeroed quickly by an impact-point regulating mechanism.

Description of the Related Art

Referring to FIGS. 1 to 3, a zeroing method for an impact-point regulating mechanism of a sight is shown. Referring to FIGS. 1 and 2, a regulating cover 10 is pulled up to become unlocked and afterwards is rotated to align a zero point of the regulating cover 10 with a zero point of a scale ring 20, whereby the impact-point regulating mechanism is zeroed. When the impact-point regulating mechanism is zeroed, the regulating cover 10 is released and returns to a locked state as shown in FIG. 3, whereby regulation of the sight for impact point can be performed.

FIGS. 4, 5 and 6 depict a cross section of the conventional impact-point regulating mechanism shown in FIGS. 1-3, wherein the regulating cover 10 is locked. FIGS. 7 and 8 depict a cross section of the conventional impact-point regulating mechanism shown in FIG. 1-3, wherein the regulating cover 10 is unlocked for zeroing. The conventional regulating mechanism for impact point includes the regulating cover 10, the scale ring 20, a base 30, a regulating bolt 40, a securing bolt 50 and a spring 60.

The base 30 is fixed to a main body 5 of the sight, and the regulating bolt 40 is screwed in the base 30 and thus joined to the base 30, whereby the regulating bolt 40 is movable in the base 30 for regulation of impact points. The scale ring 20 is disposed on an outer periphery of the base 30. The regulating cover 10 includes a first ring gear 12, and the regulating bolt 40 includes a second ring gear 42. The regulating cover 12 is capable of rotating the regulating bolt 40 through the first ring gear 12 engaging with the second ring gear 42. The securing bolt 50 is fixed to a center of the regulating bolt 40. The spring 60 and an abutting portion 14 of the regulating cover 10 are disposed in a gap between the securing bolt 50 and the regulating bolt 40. The spring 60 is a compression spring with one end propped against a head of the securing bolt 50 and the other end propped against the abutting portion 14 of the regulating cover 10.

When the sight is to be zeroed, the regulating cover 10 is pulled up and the spring 60 is compressed. The regulating cover 10 continues to be pulled until the spring 60 is compressed completely. At the same time the first ring gear 12 and the second ring gear 42 are separated to release the engagement of the regulating cover 10 and the regulating bolt 40, whereby the regulating cover 10 becomes rotatable and the zeroing process for the sight can be performed. Referring to FIGS. 2, 7 and 8, when the zeroing process is completed, the regulating cover 10 is released and thus moved by the spring 60 until the first ring gear 12 engages with the second ring gear 42, whereby the regulating cover 10 engages with the regulating bolt 40 again as shown in FIGS. 3, 4 and 5.

The spring force of the spring 60 depends on the parameters including the wire diameter, free height, effective coil number, etc. When a larger spring force is required, the spring 60 is designed to occupy more space. Thus, the positions of the regulating cover 10, the regulating bolt 40 and the securing bolt 50 need to be changed accordingly. In other words, the layout of the mechanism near the spring 60 is necessarily changed when the design of the spring 60 is changed.

BRIEF SUMMARY OF THE INVENTION

An object of the invention is to provide a sight including an impact-point regulating mechanism. The impact-point regulating mechanism includes a regulating cover used for regulating impact points. The regulating cover can be pulled up for performing a zeroing process and return to its original position by a returning mechanism when the zeroing process is completed. The returning mechanism occupies less space than the conventional one, and there is no need to change design of other mechanisms near the returning mechanism when desired returning force of the returning mechanism is changed.

The invention provides a sight. The sight in accordance with an exemplary embodiment of the invention includes a main body, a regulating bolt movably joined to the main body, a securing bolt fixed to the regulating bolt, a regulating cover covering the regulating bolt and movable between a first position and a second position with respect to the regulating bolt, a first magnet disposed on the regulating cover, and a second magnet disposed on the regulating bolt and corresponding to the first magnet. The regulating cover is movable with respect to the regulating bolt when the regulating cover moves away from the second position. The regulating cover abuts the securing bolt and is rotatable with respect to the regulating bolt when the regulating cover moves to the first position. The regulating cover engages the regulating bolt when the regulating cover moves to the second position. The regulating cover is maintained in the second position through attraction of the first magnet and the second magnet.

In another exemplary embodiment, the regulating cover includes a first ring gear, the regulating bolt includes a second ring gear, and the regulating cover engages the regulating bolt through engagement of the first ring gear and the second ring gear when the regulating cover is in the second position.

In yet another exemplary embodiment, the first ring gear is formed on an inner surface of the regulating cover, and the second ring gear is formed on an outer surface of the regulating bolt.

In another exemplary embodiment, the regulating cover includes an abutting portion, the securing bolt includes a head, and the abutting portion is disposed between the head and the regulating bolt, the abutting portion abuts the head when the regulating cover moves to the first position.

In yet another exemplary embodiment, the first magnet is annular.

In another exemplary embodiment, the second magnet is annular.

In yet another exemplary embodiment, the first magnet is disposed on a lower surface of the regulating cover.

In another exemplary embodiment, the second magnet is disposed on an upper surface of the regulating bolt.

In yet another exemplary embodiment, the sight further includes a base fixed to the main body and including a screw hole, wherein the regulating bolt screws into the screw hole so that the regulating bolt is movably joined to the base.

In another exemplary embodiment, the sight further includes a magnification regulating unit disposed in the main body, wherein the regulating bolt moves to move the magnification regulating unit.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
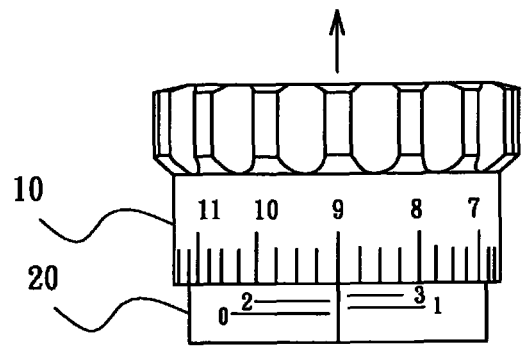
FIGS. 1-3 depict a zeroing method for an impact-point regulating mechanism of a sight.
Figure 2:
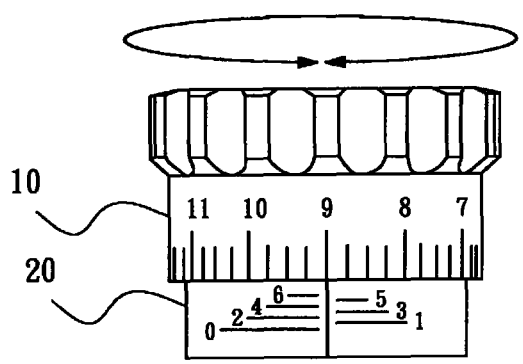
Figure 3:
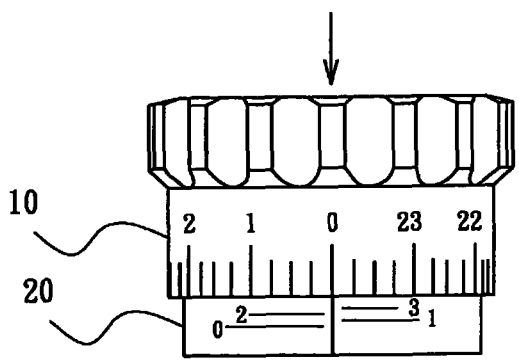
Figure 5:
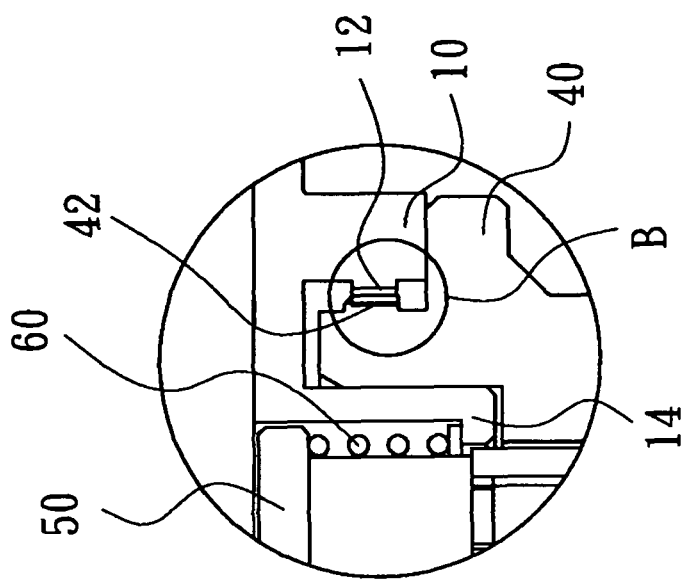
FIG. 5 is an enlarged view of a portion A of FIG. 4.
Figure 4:
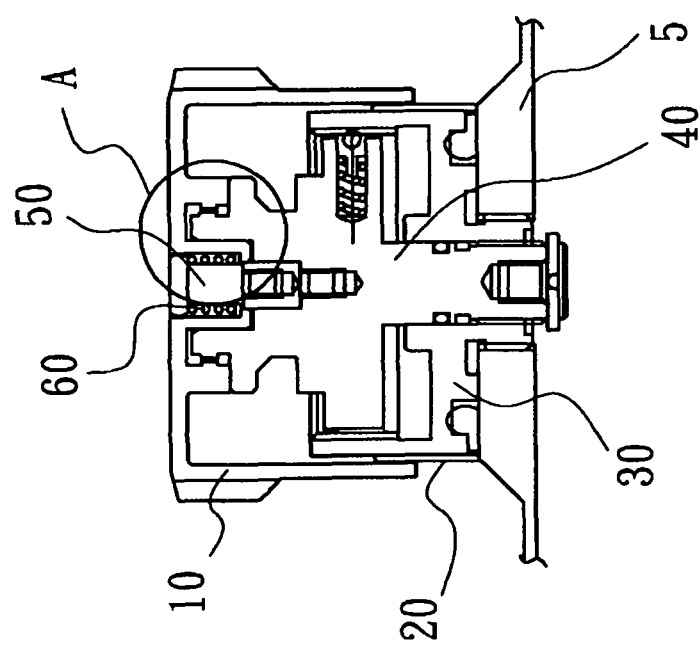
FIG. 4 is a cross section of a conventional impact-point regulating mechanism of a sight, wherein a regulating cover is locked.
Figure 6:
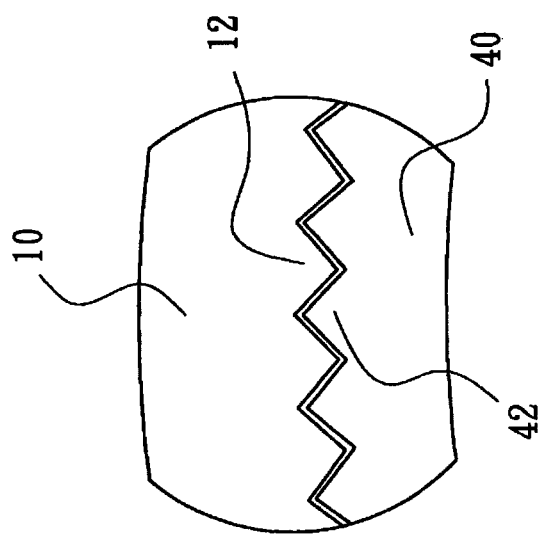
FIG. 6 is an enlarged view of a portion B of FIG. 5.
Figure 7:
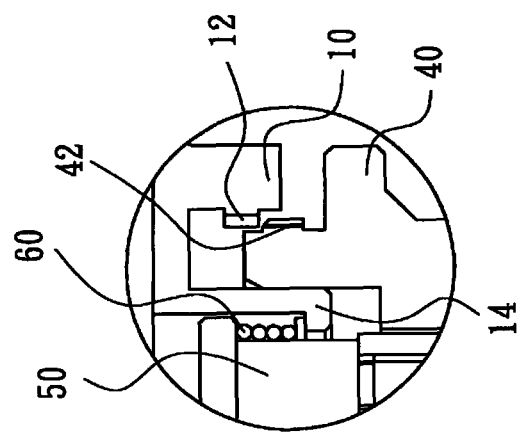
FIG. 7 is a cross section of a conventional impact-point regulating mechanism of a sight, wherein a regulating cover is unlocked.
Figure 8:
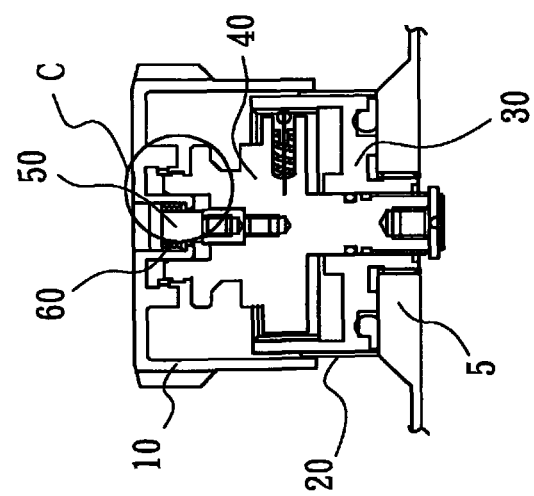
FIG. 8 is an enlarged view of a portion C of FIG. 7.
Figure 9:
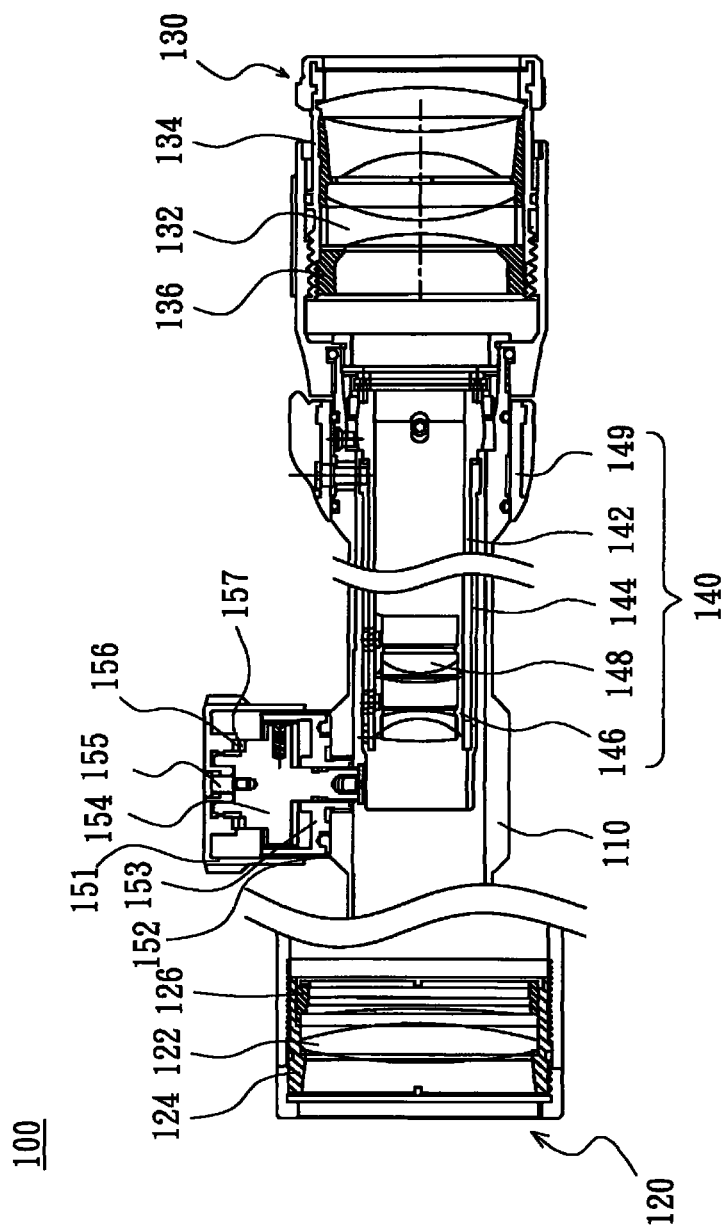
FIG. 9 is a cross section of a sight of the invention.
Figures 10, 11:
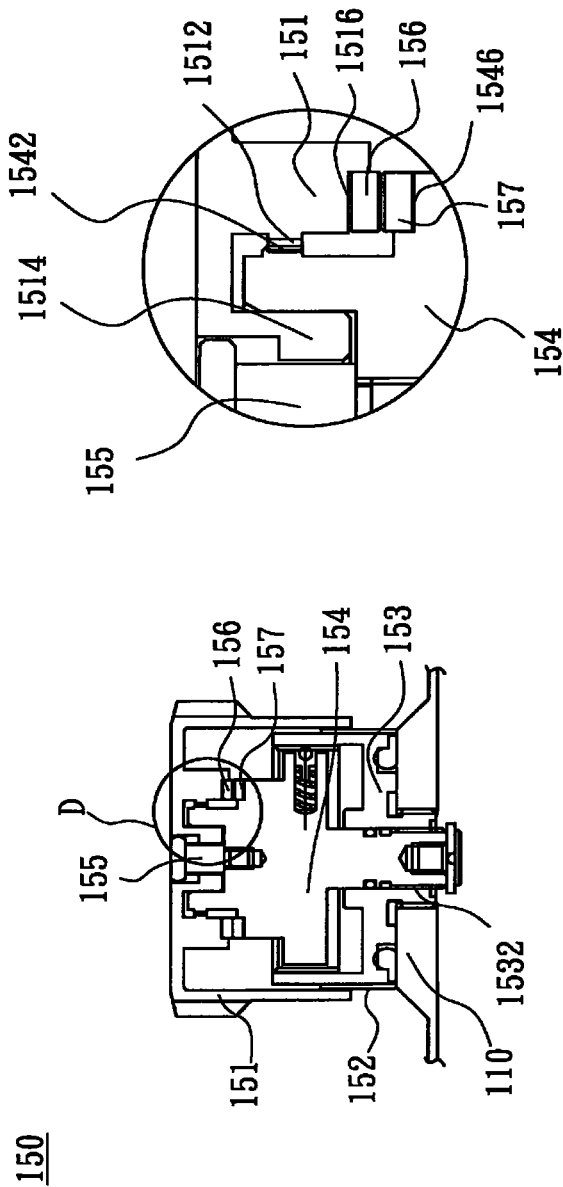
FIG. 10 is a cross section of an impact-point regulating mechanism of a sight of the invention, wherein a regulating cover is locked.
FIG. 11 is an enlarged view of a portion D of FIG. 10.
Figures 12, 13:
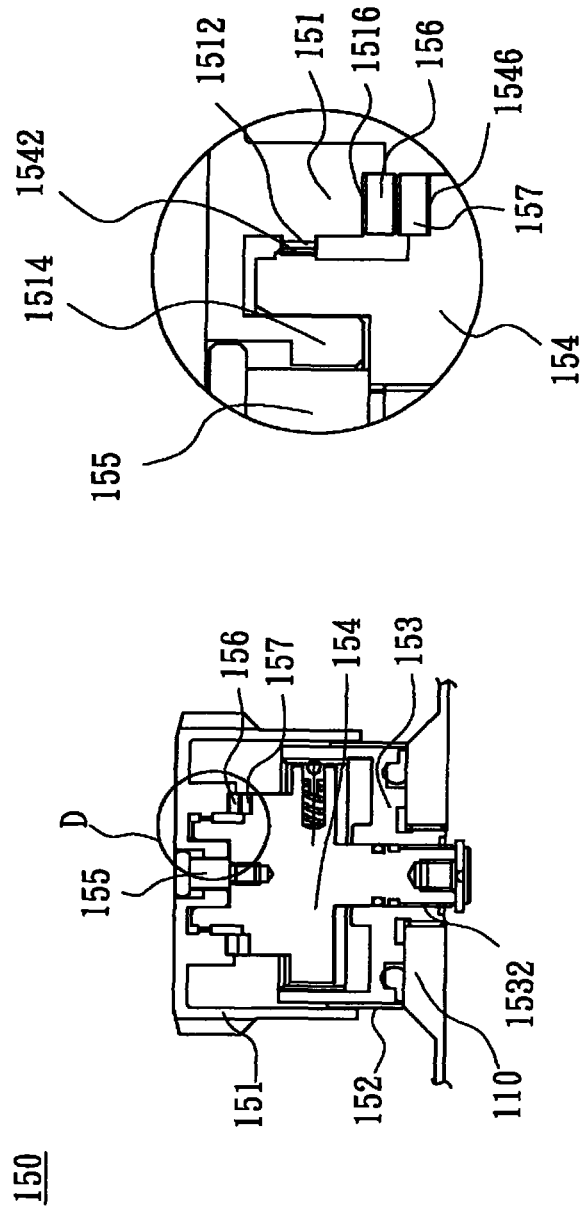
FIG. 12 is a cross section of an impact-point regulating mechanism of a sight of the invention, wherein a regulating cover is unlocked.
FIG. 13 is an enlarged view of a portion E of FIG. 12.

Referring to FIG. 9, a sight 100 of the invention includes a main body 110, an objective lens unit 120, an eyepiece unit 130, a magnification regulating unit 140 and an impact-point regulating mechanism 150.

The objective lens unit 120 is disposed at a front end of the main body 110 and includes an objective lens set 122 disposed in an objective lens room 124. The objective lens set 122 is positioned in the objective lens room 124 by a securing ring 126. The eyepiece unit 130 is disposed at a rear end of the main body 110 and includes an eyepiece lens 132. The eyepiece lens 132 is disposed in an eyepiece lens room 134 and positioned in the eyepiece lens room 134 by a securing ring 136. The magnification regulating unit 140 includes an inner erecting lens barrel 142 disposed near the rear end of the main body 110, an outer erecting lens barrel 144 disposed around the inner erecting lens barrel 142, a plurality of erecting lens barrels 146 movably disposed in the inner erecting barrel 142, a plurality of erecting lens sets 148 fixedly disposed in the erecting lens barrels 146, and a magnification regulating ring 149 disposed on an outer periphery of the outer erecting lens barrel 144 for regulating the positions of erecting lens barrels 146 by driving the outer erecting lens barrel 144 and the inner erecting lens barrel 142 so as to regulate magnification.

The impact-point regulating mechanism 150 is disposed in the main body 110 and capable of vertically or horizontally moving the outer erecting lens barrel 144 to compensate the error of impact points caused by gravity or wind. Referring to FIGS. 10-13, the impact-point regulating mechanism 150 includes a regulating cover 151, a scale ring 152, a base 153, a regulating bolt 154, a securing bolt 155, a first magnet 156 and a second magnet 157. The base 153 is disposed in the main body 110 and includes a screw hole 1532. The regulating bolt 154 is screwed into the screw hole 1532, whereby the regulating bolt 154 is movably joined to the base 153. A front end of the regulating bolt 154 abuts the outer erecting lens barrel 144 so that the outer erecting lens barrel 144 can be vertically or horizontally moved by the regulating bolt 154 to compensate error of impact points caused by gravity or wind for the magnification regulating unit 140. The scale ring 152 is disposed on an outer periphery of the base 153. The scale ring 152 has scales corresponding to scales of the regulating cover 151. A first ring gear 1512 is formed on an inner wall of the regulating cover 151, and a second ring gear 1542 is formed on an outer wall of the regulating bolt 154. The regulating cover 151 is detachably joined to the regulating bolt 154 through engagement of the first ring gear 1512 and the second ring gear 1514. By this arrangement, the regulating cover 151 rotates the regulating bolt 154 to move the outer erecting lens barrel 144 when the regulating cover 151 is rotated. The securing bolt 155 is fixed to a center of the regulating bolt 154. The regulating cover 151 includes an abutting portion 1514 disposed in a gap between the securing bolt 155 and the regulating bolt 154. The first magnet 156 is annular and disposed on a lower surface 1516 of the regulating cover 151. The second magnet 157 is also annular and disposed on an upper surface 1546 of the regulating bolt 154. The regulating cover 151 is stably joined to the regulating bolt 154 through the attraction of the first magnet 156 and the second magnet 157.

When the impact point regulating mechanism is to be zeroed, the regulating cover 151 is pulled up by resisting the attractive force between the first magnet 156 and the second magnet 157 until the abutting portion 1514 abuts a head of the regulating bolt 155. At this time, the regulating cover is in a first position, and the first ring gear 1512 and the second ring gear 1542 are separated so that the regulating cover 151 is rotatable with respect to the regulating bolt 154. The regulating cover 151 is rotated to align a zero point of the scales of the regulating cover 151 with a zero point of the scales of the scale ring 152. When the zero points are aligned, the regulating cover 151 is released and joined to the regulating bolt 154 again through the attraction of the first magnet 156 and the second magnet 157. At this time, the regulating cover 151 is in a second position, and the regulating cover 151 engages the regulating bolt 154 through the engagement of the first ring gear 1512 and the second ring gear 1542 and is capable of performing regulation.

Through the first magnet 156 and the second magnet 157, the impact point regulating mechanism of the invention can be stably and quickly zeroed, and the regulating cover 151 is able to engage with the regulating bolt 154 smoothly and reliably. In addition, the only requirement for installment is to locate the first magnet 156 and the second magnet 157 on the regulating cover 151 and the regulating bolt 154 respectively. Therefore, the arrangement of the first magnet 156 and the second magnet 157 is more flexible than that of a spring. Since there is no need to change the dimensions of the first and second magnets 156 and 157 when desired magnetic force is changed, more space is left for other mechanisms and there is no need to change design of the mechanisms near the magnets 156 and 157.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A sight, comprising:
   a main body;

a regulating bolt movably joined to the main body;

a securing bolt fixed to the regulating bolt;

a regulating cover covering the regulating bolt and movable between a first position and a second position with respect to the regulating bolt, wherein the regulating cover is movable with respect to the regulating bolt when the regulating cover moves away from the second position, the regulating cover abuts the securing bolt and is rotatable with respect to the regulating bolt when the regulating cover moves to the first position, and the regulating cover engages the regulating bolt when the regulating cover moves to the second position;

a first magnet disposed on the regulating cover; and a second magnet disposed on the regulating bolt and corresponding to the first magnet, wherein the regulating cover is maintained in the second position through attraction of the first magnet and the second magnet.

2. The sight as claimed in claim 1, wherein the regulating cover comprises a first ring gear, the regulating bolt comprises a second ring gear, and the regulating cover engages the regulating bolt through engagement of the first ring gear and the second ring gear when the regulating cover is in the second position.

3. The sight as claimed in claim 2, wherein the first ring gear is formed on an inner surface of the regulating cover, and the second ring gear is formed on an outer surface of the regulating bolt.

4. The sight as claimed in claim 1, wherein the regulating cover comprises an abutting portion, the securing bolt comprises a head, and the abutting portion is disposed between the head and the regulating bolt, the abutting portion abuts the head when the regulating cover moves to the first position.

5. The sight as claimed in claim 1, wherein the first magnet is annular.

6. The sight as claimed in claim 5, wherein the second magnet is annular.

7. The sight as claimed in claim 1, wherein the second magnet is annular.

8. The sight as claimed in claim 1, wherein the first magnet is disposed on a lower surface of the regulating cover.

9. The sight as claimed in claim 8, wherein the second magnet is disposed on an upper surface of the regulating bolt.

10. The sight as claimed in claim 1, wherein the second magnet is disposed on an upper surface of the regulating bolt.

11. The sight as claimed in claim 1 further comprising a base which is fixed to the main body and comprises a screw hole, wherein the regulating bolt screws into the screw hole so that the regulating bolt is movably joined to the base.

12. The sight as claimed in claim 1 further comprising a magnification regulating unit disposed in the main body, wherein the regulating bolt moves to move the magnification regulating unit.

\* \* \* \* \*